Patented Jan. 4, 1944

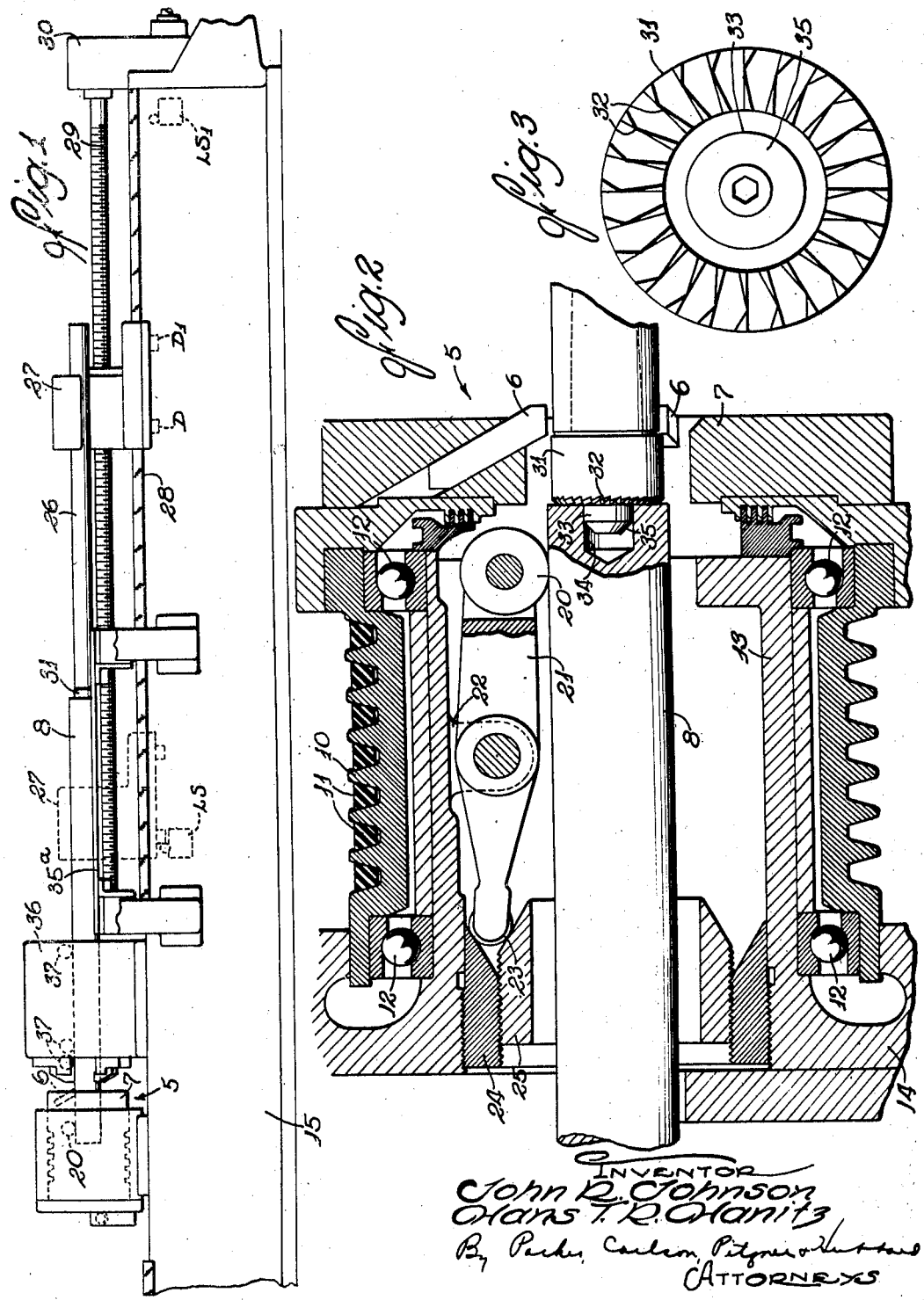

2,338,687

UNITED STATES PATENT OFFICE 2,338,687

MACHINE FOR SCALPING BARS

John R. Johnson and Hans T. R. Hanitz, Rockford, Ill., assignors to The Ingersoll Milling Machine Company, Rockford, Ill., a corporation of Illinois Application September 12, 1940, Serial No. 356,471

6 Claims. (Cl. 82—20)

The invention relates to machines for scalping metal billets, bars or other elongated workpieces, and more particularly to an improved scalping machine of the type in which the entire peripheral surface of the work is scalped in a single traverse past the scalping tool.

One object is to provide an improved feed mechanism for scalping machines of the above general character whereby the machine structure is materially simplified and the quality of the work performed thereby is substantially improved.

A more specific object is to provide an improved feed mechanism wherein a single actuating member, such as a push rod or ram, is effective to impart feed movements to the work throughout its full traverse relative to the scalping tool, thus avoiding any irregularities in the feed which might occur in shifting from one feed mechanism to another while the tool is operating on the work.

Another object is to provide an improved feed mechanism having a single actuator adapted both to impart feed movements to the work and to hold the work against rotation while it is operated on by the tool.

Other objects and advantages of the invention will become apparent from the following detailed description of the preferred embodiment illustrated in the accompanying drawing, in which Figure 1 is a side elevational view of a scalping machine embodying the features of the invention.

Fig. 2 is a longitudinal sectional view through the tool and tool supporting head showing the relationship of the cutting blades, the work and the actuator for imparting feed movements to the work.

Fig. 3 is an end elevational view of the feed actuator or ram.

The invention is especially applicable to scalping machines of the type disclosed in the patent to Hans T. R. Hanitz, No. 2,201,173, and for purposes of illustration has been shown as incorporated in such a machine. The particular machine illustrated is designed for preparing cylindrical metal billets or bars 8 for subsequent rolling, drawing or tube forming operations by removing the outer surface layer so that imperfections commonly found therein are not carried over to the finished product. This metal removing or scalping operation is performed by a tool 5 (Figs. 1 and 2) herein comprising a series of radially extending cutter blades 6, mounted on and projecting inwardly from an annular body 7 supported for rotation about a central axis. The blades 6 are preferably spaced apart both circumferentially and axially so that the bar will be scalped and a smooth surface formed thereon as it is fed endwise through the cutter while being held against turning.

The cutter body 7 is clamped against one end of a pulley 10 driven by a series of V-belts 11 and journaled in anti-friction bearings 12. The latter are supported on opposite ends of a tube 13 which is rigid with and projects from a housing 14 upstanding from the horizontal bed 15 of the machine.

Suitable means is provided in the frame 13 for supporting and guiding the bar after it passes the cutter blades 6. This means as shown in Fig. 2, comprises a series of rollers 20, each journaled at one end of an arm 21 extending longitudinally of the frame and pivotally supported intermediate its ends on a lug 22 projecting from the inner wall of the frame. The outer ends of the arms 21 are fitted with cam rollers 23 engageable between the oppositely sloping tapered end portions of a pair of concentrically arranged sleeves 24 and 25. The sleeve 24 is threaded into the tube 13 while the sleeve 25 is threaded into the sleeve 24. By adjusting these sleeves, the arms 21 may be rocked about their pivots to move the rollers 20 toward and from the bar 8 as required for the accommodation of bars of different sizes.

The bars 8 are fed into operative engagement with the tool by an elongated push rod or ram 26 supported at one end on a slide 27 guided along parallel ways 28 on the bed 15. The slide 27 may be fed by any suitable means such as a lead screw 29 driven through suitable speed reduction gearing enclosed in a housing 30 at the rear end of the base. Such movements are controlled by control circuits of the type disclosed in the prior patent above referred to through the medium of limit switches LS and LS₁ actuated in well known manner by dogs D and D₁ carried on the head.

In order to enable the ram 26 to feed the bar 8 past the tool throughout its entire length, the bar engaging end 31 of the ram is made of smaller diameter than the paths described by the cutter blades.

In accordance with the present invention, the ram is also utilized to perform the additional function of holding the bar 8 while it is being scalped. To this end, the end of the ram head 31 is formed with hardened teeth 32 adapted to bite into the end of the bar and effect a driving connection therewith capable of sustaining the torque applied to the bar during scalping thereof. In the present instance, the effective edges of the teeth are disposed in a plane perpendicular to the ram axis and preferably faced in a direction opposite to the direction of rotation of the tool so that the torque applied to the bar simply causes the teeth to bite in deeper and thus hold the bar securely against rotational movement.

In order to maintain exact lateral alinement of the bar 8 and the ram 26 throughout the entire feed movement, the ram head 31 is formed with a forwardly projecting cylindrical boss 33 adapted to engage in a complementary recess 34 in the end of the bar. The outer end of the boss may be tapered as indicated at 35 to facilitate entry of the boss in the recess.

The recesses 34 are ordinarily drilled or bored in the bars to insure proper centering of the same in tube drawing operations or the like. Accordingly, the engagement of the boss 33 in this recess acts to accurately center the bar with respect to the scalping tool so that the finished surface is exactly concentric with the central axis of the bar. This interengagement of the boss in the recess serves further to maintain exact lateral relationship of the ram and the bar as the trailing end passes the cutter blades 6. Thus, any lateral thrust developed by the last cutter blade to act on the bar is effectually resisted by the ram and displacement of the bar is prevented thereby insuring an accurate finish of the bar throughout its entire length.

At the beginning of each operating cycle, the slide 27 is, of course, retracted to the extreme right end of the ways 28 (as viewed in Fig. 1) so that a bar 8 may be loaded on a trough 35a. The bars may be delivered to the trough in any suitable manner as by a loading mechanism, such as that disclosed in the prior patent. The trough is positioned to aline the bar with the ram 26 so that the boss 33 will enter the recess 34 on forward movement of the ram from retracted position.

To insure proper presentation of the leading end of the bar 8 to the tool, an auxiliary guide 36 may be provided between the trough and the tool head. The auxiliary guide may be of any suitable construction and, as shown, comprises a hollow cylindrical frame within which are mounted a series of adjustable guide rollers 37 spaced circumferentially to engage the bar at a plurality of points and thus guide it into proper relation to the cutting blades.

In the operation of the machine, a bar 8 is loaded on the trough 35a while the slide 27 is in its retracted position. It will be observed that this loading operation is extremely simple, entailing no more than simply dropping the bar into a trough, and does not necessitate shifting and clamping of opposed centers to receive the work as would be the case in an ordinary lathe type of turning machine. Accordingly, the simple structure of the present machine, made possible by the use of a rotating tool and pusher-ram feed of a non-rotating workpiece, not only minimizes the initial cost of the machine but also materially enhances its production capacity. As the slide is advanced by the lead screw 29, the boss 33 on the ram enters the recess 34 and the teeth 32 engage the end face of the bar to grip the same. As to the latter, it will be noted that the leading portion of the bar is received in the entry guide 36 and the latter resists endwise movement of the bar sufficiently that the ram teeth 32 bite into and properly engage the bar in the course of its initial advance. The ram pushes the bar along the trough through the guide 36 and into operative engagement with the cutter blades. This movement continues until the entire bar has passed the cutter blades as shown in Fig. 2, whereupon the slide 27 is retracted to prepare the machine for the reception of the next bar.

As the bar passes the tool, the cutter blades act to scalp the entire peripheral surface of the same and thus prepare it for subsequent operations. The finished bar may be removed from the machine in any suitable manner as by a pulling device such as that disclosed in the prior patent. It will be appreciated, however, that the pulling device does not engage the work until the entire surface has been scalped, thus avoiding any possibility of irregularities in the surface finish produced by the tool such as might arise from a slight misalinement of the pulling mechanism with respect to the ram 26. Moreover, the pulling mechanism may be of relatively simple and light weight construction since it is not required to impart feed movements to the bar while the tool is operating thereon. Since the work does not have to be drawn back past the tools of its initial position for unloading purposes, the danger of scratching the work during any such return motion is obviated. This is of particular importance in preparing bars for wire drawing since any surface scratches will almost inevitably spoil the finished wire and consequently great care must be taken to prevent scratching.

It will be apparent from the foregoing that the invention provides a feed mechanism of novel and improved construction for scalping machines of the type in which the entire peripheral surface of a bar or billet is scalped in a single passage relative to the tool. The improved feed mechanism is constructed and arranged so that a single feed actuator in the form of a push rod or ram is effective to impart feed movements to the bar throughout its entire range of travel past the scalping tool. Since this ram alone is adapted to impart the feed movements, irregularities in feed, due to switching from one feed mechanism to another, is avoided, thus insuring greater accuracy in the finished work. Moreover, the ram is arranged in novel manner to hold the work against rotation while the tool is operating thereon, thus eliminating complicated and expensive holding apparatus heretofore required in such machines.

We claim as our invention:

1. In a machine for scalping elongated metal bars, the combination of a rotary metal removing tool, means for receiving a bar and locating it at one side of the tool substantially in alinement with the latter's axis of rotation, a ram engageable with one end of the bar to push the same endwise along said axis, power actuated means for advancing said ram through a stroke of sufficient length to push the trailing end of the bar past said tool, the bar engaging end portion of the ram being dimensioned to pass the tool without interference therewith, and guide means located beyond said tool and acting progressively on the machined portion of the bar to support and guide the bar after the trailing end passes said tool.

2. In a machine for scalping elongated metal bars each having a recess in one end, the combination of a metal removing tool, a ram having a head adapted to abut against the end of the bar and a projection on said head engageable in the recess of a bar to be scalped, said head being dimensioned to pass said tool without interference, power actuated means for advancing the ram to push the entire bar including the trailing end past the tool, and guide means located beyond the tool and acting to support and guide the bar after the trailing end passes the tool, the engagement of said projection on the ram in the recess in said bar acting to maintain the position of the bar while the tool is acting on the trailing end of the bar.

3. In a machine for scalping elongated cylindrical metal bars, the combination of a metal removing tool rotatable about an axis concentric with the bar to be operated on, a power actuated ram operable to push the bar longitudinally relative to the rotating tool, a series of teeth formed in said ram engageable with the trailing end of the bar and operative upon such engagement to hold the bar against rotation while the tool is operating thereon, and means for frictionally resisting endwise movement of the bar prior to its contact with said tool for effecting engagement of the bar by said teeth as the ram is pushed against the trailing end of the bar.

4. In a machine for scalping elongated metal bars each having a recess in one end, the combination of a rotary metal removing tool having a cutter blade rotatable in a circular path around the axis of a bar to be scalped, a ram having a head adapted to abut against the end of the bar and a projection on said head engageable in the recess of a bar to be scalped, said head being of smaller dimensions than the path described by the cutter blade whereby to permit the ram to clear the blade in its movement past the same, power actuated means for advancing the ram along the axis of rotation of said tool to push the entire bar including the trailing end past the tool, guide means located beyond the tool and acting to support and guide the bar after the trailing end passes the tool, the engagement of said projection on the ram in the recess in said bar acting to maintain the bar against lateral displacement while the tool is acting on the trailing end of the bar, and teeth on said ram head engageable with the trailing end of the bar to hold the bar against rotation by said tool as the latter rotates in cutting engagement with the bar.

5. In a machine for scalping elongated cylindrical metal bars, the combination of a metal removing tool rotatable about an axis concentric with the bar to be operated on, a power actuated ram operable to push the bar longitudinally relative to the rotating tool, a series of teeth formed on said ram engageable with the trailing end of the bar and operative upon such engagement to hold the bar against rotation while the tool is operating thereon, and means including a plurality of guide rollers positioned for contact of at least one of the same with said bar throughout the entire endwise movement of the bar for frictionally resisting such endwise movement of the latter to insure firm engagement of said teeth with the bar's trailing end.

6. In a machine for scalping elongated metal bars, the combination of a metal removing tool rotatable in a fixed axial plane and operable to scalp the external surface of a bar fed along the rotational axis of the tool, means spaced along said axis from said tool and engageable with the sides of a bar to support the same substantially in alinement with said axis, a power actuated ram movable along said supporting means toward and away from said tool and engageable with the remote end of a supported bar to push the bar axially along and past the supporting means and past said tool, and means on the end of said ram engageable with the trailing end surface of said bar and operable under the pressure derived from engagement of the bar and tool to hold the bar against rotation while the tool is operating thereon.

JOHN R. JOHNSON.
HANS T. R. HANITZ.